United States Patent
Chakraborty et al.

(10) Patent No.: US 10,924,394 B2
(45) Date of Patent: Feb. 16, 2021

(54) COMPUTING LABEL-SWITCHED DATA COMMUNICATION PATHS

(71) Applicant: Keysight Technologies Singapore (Sales) Pte. Ltd., Singapore (SG)

(72) Inventors: Joy Chakraborty, Bangalore (IN); Joydeep Banerjee, Salt Lake (IN)

(73) Assignee: KEYSIGHT TECHNOLOGIES SINGAPORE (SALES) PTE. LTD., Singapore (SG)

( * ) Notice: Subject to any disclaimer, the term of this patent is extended or adjusted under 35 U.S.C. 154(b) by 0 days.

(21) Appl. No.: 16/557,405

(22) Filed: Aug. 30, 2019

(65) Prior Publication Data
US 2019/0386916 A1 Dec. 19, 2019

Related U.S. Application Data

(62) Division of application No. 15/713,558, filed on Sep. 22, 2017, now Pat. No. 10,447,587.

(51) Int. Cl.
| | |
|---|---|
| *H04L 12/723* | (2013.01) |
| *H04L 29/06* | (2006.01) |
| *H04L 12/717* | (2013.01) |
| *H04L 12/721* | (2013.01) |
| *H04L 12/18* | (2006.01) |
| *H04J 3/06* | (2006.01) |

(52) U.S. Cl.
CPC .............. *H04L 45/50* (2013.01); *H04L 45/42* (2013.01); *H04L 45/44* (2013.01); *H04L 69/18* (2013.01); *H04J 3/0658* (2013.01); *H04L 12/1881* (2013.01); *H04L 69/28* (2013.01)

(58) Field of Classification Search
CPC ......... H04L 45/50; H04L 69/18; H04L 69/28; H04L 12/1881; H04L 12/18; H04L 12/185; H04L 45/16; H04L 49/201; H04J 3/0658
See application file for complete search history.

(56) References Cited

U.S. PATENT DOCUMENTS

| | | | |
|---|---|---|---|
| 7,496,105 B2 | 2/2009 | Vasseur et al. | |
| 7,522,603 B2 | 4/2009 | Vasseur | |
| 7,808,972 B2 | 10/2010 | Zhang | |
| 7,957,380 B2 * | 6/2011 | Mirtorabi | ................ H04L 45/32 370/392 |

(Continued)

OTHER PUBLICATIONS

Davie, Bruce S., and Yakov Rekhter. MPLS: technology and applications. Morgan Kaufmann Publishers Inc., 2000. (Year: 2000).*

(Continued)

*Primary Examiner* — Sharad Rampuria

(57) ABSTRACT

Methods, systems, and computer readable media for computing label-switched data communication paths are disclosed. An example method includes receiving, by a path computation element (PCE) implemented on at least one processor, synchronization status information for routing nodes in a label-switched network. The method includes receiving, by the PCE, a request for a label-switched path (LSP) from a client. The method includes determining, by the PCE, a responsive LSP based at least in part on the synchronization status information. The method includes sending, by the PCE, an explicit route object (ERO) for the responsive LSP to the client.

6 Claims, 8 Drawing Sheets

(56) References Cited

U.S. PATENT DOCUMENTS

| | | | |
|---|---|---|---|
| 8,406,124 B2 | 3/2013 | Long et al. | |
| 8,885,463 B1* | 11/2014 | Medved | H04L 45/50 |
| | | | 370/228 |
| 9,614,726 B2 | 4/2017 | Farkas et al. | |
| 9,667,518 B2 | 5/2017 | Lakshmikantha et al. | |
| 9,667,525 B2 | 5/2017 | Jocha et al. | |
| 10,447,587 B2 | 10/2019 | Chakraborty et al. | |
| 2008/0101418 A1 | 5/2008 | Vasseur | |
| 2008/0151746 A1 | 6/2008 | Vasseur et al. | |
| 2008/0151896 A1* | 6/2008 | Zhang | H04L 45/10 |
| | | | 370/392 |
| 2009/0245253 A1 | 10/2009 | Chen et al. | |
| 2010/0054267 A1 | 3/2010 | Bernstein et al. | |
| 2016/0094438 A1* | 3/2016 | Dutta | H04L 45/021 |
| | | | 370/389 |
| 2019/0097922 A1 | 3/2019 | Chakraborty et al. | |

OTHER PUBLICATIONS

Beller, Dieter, and Rolf Sperber. "MPLS-TP—the new technology for packet transport networks." 2. DFN-Forum Kommunikationstechnologien. Gesellschaft für Informatik eV, 2009. (Year: 2009).*

Notice of Allowance and Fee(s) Due and Examiner-Initiated Interview Summary for U.S. Appl. No. 15/713,558 (dated Jun. 5, 2019).

Commonly-assigned, co-pending U.S. Appl. No. 15/713,558 for "Computing Label-Switched Data Communication Paths," (Unpublished, filed Sep. 22, 2017).

Jacob, "A Quick Start to Path Computation Element (PCE)," http://www.packetdesign.com/blog/quick-start-path-computation-element-pce/, pp. 1-6 (Feb. 28, 2017).

Goralski et al., "Label Switching and Label-switched Paths (LSPs)," JUNOS OS for Dummies, 2nd Edition, http://www.dummies.com/programming/networking/juniper/label-switching-and-label-switched-paths-lsps/, pp. 1-5 (May 31, 2017).

"MPLS TE Basics-Knowledge Base," https://sites.google.com/site/amitsciscozone/home/important-tips/traffic-engineering/mpls-te-basics, pp. 1-22 (May 31, 2017).

"Segment Routing and Path Computation Element," Nokia, Technology White Paper, Nokia.com, pp. 1-35 (2016).

"Spirent TestCenter: PCEP Emulation," Spirent, Rev A, Spirent.com, pp. 1-4 (Apr. 2015).

Farrel et al., "Unanswered Questions in the Path Computation Element Architecture," Internet Engineering Task Force, ISSN: 2070-1721, RFC 7399, pp. 1-29 (Oct. 2014).

Vasseur et al., "Path Computation Element (PCE) Communication Protocol (PCEP)," Network Working Group, RFC 5440, pp. 1-87 (Mar. 2009).

Bhatia et al. "IS-IS Generic Cryptographic Authentication," Network Working Group, RFC 5310, pp. 1-12 (Feb. 2009).

Li et al., "IS-IS Cryptographic Authentication," Network Working Group, RFC 5304, pp. 1-11 (Oct. 2008).

Le Roux et al., "OSPF Protocol Extensions for Path Computation Element (PCE) Discovery," Network Working Group, RFC 5088, pp. 1-20 (Jan. 2008).

Le Roux et al., "IS-IS Protocol Extensions for Path Computation Element (PCE) Discovery," Network Working Group, RFC 5089, pp. 1-17 (Jan. 2008).

Ash et al., "Path Computation Element (PCE) Communication Protocol Generic Requirements," Network Working Group, RFC 4657, pp. 1-21 (Sep. 2006).

Kompella et al., "Detecting Multi-Protocol Label Switched (MPLS) Data Plane Failures," Network Working Group, RFC 4379, pp. 1-50 (Feb. 2006).

Oran, "OSI IS-IS Intra-domain Routing Protocol," Network Working Group, RFC 1142, pp. 1-152 (Feb. 1990).

* cited by examiner

COMPUTING LABEL-SWITCHED DATA COMMUNICATION PATHS

PRIORITY CLAIM

This application is a divisional of U.S. patent application Ser. No. 15/713,558, filed Sep. 22, 2017; the disclosure of which is incorporated herein by reference in its entirety.

TECHNICAL FIELD

The subject matter described in this specification relates generally to computing label-switched data communication paths, e.g., through synchronized routing nodes in a segment routed (SR) multiprotocol label switching (MPLS) label-switched network, and to validating label-switched data communication paths.

BACKGROUND

A path computation element (PCE) is an entity, often used within an Multiprotocol Label Switching (MPLS) environment, that is capable of computing a suitable network path for transmitting data between a source and destination by applying computational constraints. Routers in a label-switched network each typically have an internal clock, which may experience drift over time. Routers with clocks out of synchronization may present various issues with control plane functioning. Conventional PCE architectures do not consider synchronization between routers while computing label-switched paths (LSPs). Such LSPs are prone to provide incorrect and often misleading ping statistics and may be more vulnerable from sudden outages leading to disruption of MPLS traffic engineering (TE) services.

Accordingly, a need exists for improved methods, systems, and computer readable media for computing label-switched data communication paths to address synchronization and to validating label-switched data communication paths.

SUMMARY

Methods, systems, and computer readable media for computing label-switched data communication paths among synchronized nodes are disclosed. An example method includes receiving, by a path computation element (PCE) implemented on at least one processor, synchronization status information for routing nodes in a label-switched network. The label-switched network may be a segment routed (SR) multiprotocol label switching (MPLS) network. The method includes receiving, by the PCE, a request for a label-switched path (LSP) from a client. The method includes determining, by the PCE, a responsive LSP based at least in part on the synchronization status information. The method includes sending, by the PCE, an explicit route object (ERO) for the responsive LSP to the client.

The features described in this specification may be implemented using any appropriate combination of computing components, for example, hardware, software, and firmware. The terms "function" "node" or "module" refer to hardware, which may also include software and/or firmware components, for implementing the feature being described. In some examples, the features described in this specification may be implemented using a computer readable medium storing computer executable instructions that when executed by at least one processor of a computer control the computer to perform operations. Examples of appropriate computer readable media include non-transitory computer-readable media, such as disk memory devices, chip memory devices, programmable logic devices, and application specific integrated circuits. A computer readable medium may be located on a single device or computing platform or may be distributed across multiple devices or computing platforms.

DETAILED DESCRIPTION

Figure 1:
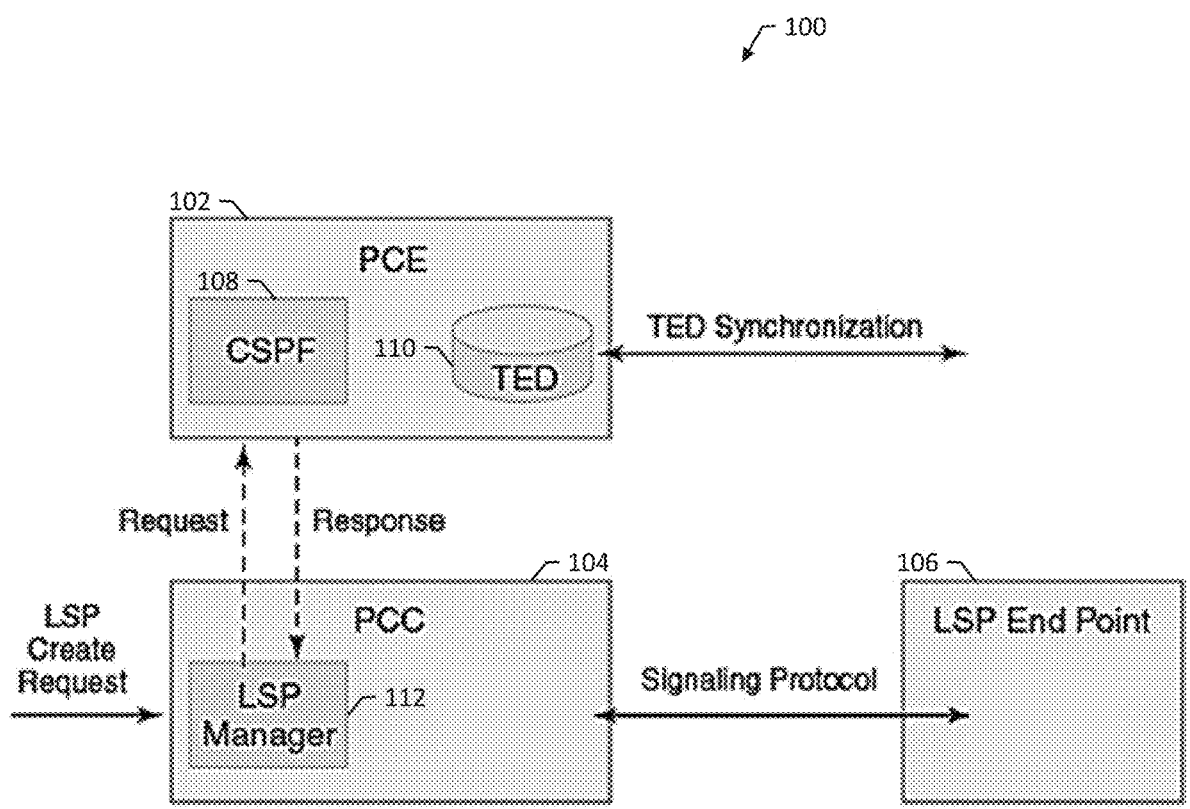
FIG. 1 is a block diagram of an example network for computing label-switched data communication paths and validating label-switched data communication paths.

FIG. 1 is a block diagram of an example network 100 for computing label-switched data communication paths, e.g., through synchronized routing nodes, and to validating label-switched data communication paths. Network 100 includes a path computation element (PCE) 102, and path computation client (PCC) 104, and a label-switched path (LSP) end point 106. Network 100 can be any appropriate type of label-switched network, e.g., a segment routed (SR) multiprotocol label switching (MPLS) label-switched network.

MPLS networks may be used in high-bandwidth telecommunications networks and other appropriate networks. In general, MPLS networks route data between routing nodes in the network based on path labels instead of network addresses. A routing node is typically a hardware device or a number of devices configured for receiving and routing network messages; for example, a routing node can be a label switch router, a label edge router, or a provider router.

Using path labels can be useful, e.g., to avoid complex lookups in a routing table. The path labels typically identify paths, i.e., virtual links, between distant routing nodes. MPLS can encapsulate packets of various network protocols, and MPLS generally supports a variety of access technologies. MPLS typically works in conjunction with the internet protocol (IP) and its routing protocols, e.g., interior gateway protocol (IGP).

PCE 102 is configured for computing a suitable network path for transmitting data between a source and destination by applying computational constraints. PCE 102 can be implemented as an external server application or, alternatively, can be integrated within/coupled to a network component such as the headend router. PCE 102 includes a path determiner such as a constrained shortest path first (CSPF) module 108.

PCE 102 builds core network topology and Traffic Engineering Database (TED) 110 based on Interior Gateway Protocol (IGP) TE extensions. PCE 102 gathers network resource information like topology, bandwidth, link costs, existing LSPs and the like. This information can be collected via peering with IGPs (OSPF, IS-IS) or BGP-LS.

In operation, PCE 102 operates as an active, stateful PCE to modify one or more LSP attributes, such as a bandwidth, an explicit route object (ERO) to modify the path, and a priority (setup and hold). EROs limit LSP routing to a specified list of routing nodes. EROs can specify, e.g., loose hops and strict hops. PCE 102 can use a path computation element protocol (PCEP) to communicate these new LSP attributes from PCE 102 to PCC 104, after which PCC 104 re-signals the LSP in the specified path.

In the example illustrated in FIG. 1, a transmission control protocol (TCP)-based PCEP session connects PCC 104 to PCE 102. PCC 104 initiates, using an LSP manager 112, the PCEP session and stays connected to PCE 102 for the duration of the PCEP session. During the PCEP session, PCC 104 requests LSP parameters from PCE 102.

On receiving one or more LSP parameters from PCE 102, PCC 104 re-signals the TE LSP. When the PCEP session is terminated, the underlying TCP connection is closed immediately. PCC 104 may attempt to re-establish the PCEP session.

Standard MPLS Operations, Administration, and Maintenance (OAM) techniques like LSP Ping/Traceroute use network time protocol (NTP) timestamp comparisons and do not generally use hardware timestamps. Some conventional PCEs compute MPLS LSPs based just on TE parameters. Examples of TE parameters may include, link bandwidth associated with a hop, lowest number of hops between source and destination, and the like.

Typically, forwarding plane issues are detected outside of PCE 102 through an MPLS OAM subsystem. So even when PCE 102 is able to calculate a LSP with a proper TE constraint (e.g. high bandwidth), such LSP will not be ready for MPLS OAM unless LSP end routers are synchronized properly with an NTP master (since an LSP ping uses NTP timestamp in MPLS echo request and reply).

Moreover, one common issue for IGPs is MD5 authentication, e.g., at interface level as well as for route updates and performing authentication through hitless rollover using key chain. Because of clock skew amongst routers in the ERO, rollover may be impacted resulting in both router level and interface level authentication to fail. Authentication failure can impact router operation.

Routers with their clocks out of synchronization with a common stratum and also among themselves may pose various issues with control plane functioning. Each routers has an internal clock which may experience drift over a period. So with differing clocks, routers do not have a coherent treatment on remaining lifetime of a LSP which plays a key role in LSP purge function.

Some conventional IGP protocols like open shortest path first (OSPF) and intermediate systems to intermediate system (IS-IS) do this in a slightly different manner. While OSPF only allows only self-originated link state advertisement (LSA) to be purged, IS-IS allows in certain cases even non-self-originated purging. So the first router that detects that a LSP's lifetime has gone to zero then initiates a network-wide purge of that expired LSP. Lack of clock synchronization among participating routers make the decision random and increases control plane load.

In light of these issues related to synchronization among routers in an MPLS networking environment, PCE 102 can be configured to compute an LSP that takes into consideration the degree of synchronization that exists between the routing nodes that comprise a chosen path.

Figure 2:
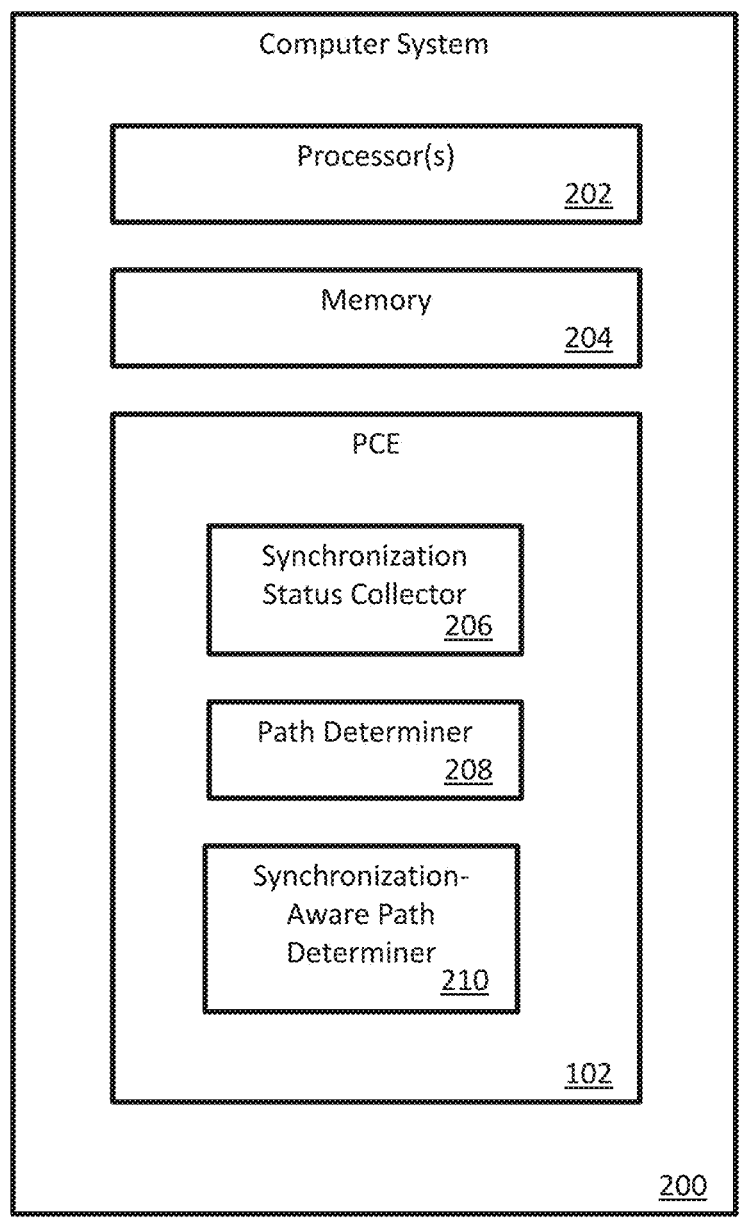
FIG. 2 illustrates an example computer system implementing the PCE of FIG. 1.

FIG. 2 illustrates an example computer system 200 implementing the PCE 102 of FIG. 1. Computer system 200 includes at least one processor 202 and memory 204 (e.g., random access memory) storing executable instructions for the processor. Computer system 200 includes the PCE 102 which is implemented using processors 202 and memory 204.

While the high level function of a PCE is defined, the particular algorithm(s) used to compute a path through the network are not mandated. Some standards documents (e.g., the base specification RFC 5440 that introduces PCEP and other accompanying specifications from IETF) do not attempt to standardize path computation algorithms.

PCE 102 may be configured for extending path computation element protocol (PCEP) to announce synchronized path computation ability for the label-switched network. PCE 102 may also be configured for extending the PCEP to support receiving client requests for synchronized path computation. For example, PCE 102 may implement a "Synchronization aware computation capability" type-length-value (TLV) as part of PCEP OPEN object to announce support for the feature in an open message while setting up a PCEP session.

As illustrated in the example of FIG. 2, PCE 102 includes a synchronization status collector 206, a path determiner 208, and a synchronization-aware path determiner 210. Synchronization status collector 206 is configured for receiving synchronization status information for routing nodes in a label-switched network. Path determiner 208 is configured for determining LSPs using conventional TE parameters. Synchronization-aware path determiner 210 is configured for determining LSPs based at least in part on the synchronization status information collected by synchronization status collector 206.

Some conventional routers use NTP to synchronize their system clocks with an external time source (e.g. a reference Clock, or with a global positioning system (GPS)). NTP is a hierarchical protocol and is divided into stratum which define the distance from the reference clock. Receiving synchronization status information can include receiving network time protocol (NTP) stratum information for each routing node.

A reference clock source that relays UTC (Coordinated Universal Time) time and has little or no delay is known as a stratum-0 device. Stratum-0 servers generally are not used on the network; instead, they are directly connected to computers which then operate as primary time servers. A primary server that receives a time signal from a stratum 0 device either through the GPS network or national time and frequency transmission is known as a stratum-1 device.

On a network a stratum 1 time server supplies the time to other devices on the network which are known as stratum-2 devices. These also can be used as a time source and equipment that connects to a stratum-2 device to receive it become stratum-3 and so on. NTP can handle up to 16 different stratum levels, although the lower down the hierarchy you go the less accurate the devices become and stratum 16 indicates the device is unsynchronized.

A router within an MPLS networking environment connects to an NTP time server, where the time server is associated with a given NTP stratum. The router's OA&M subsystem maintains synchronization status information, which includes information that identifies the stratum of the time server to which it is connected. Synchronization status collector 206 can collect the synchronization information using any appropriate technique and may store the synchronization information, e.g., in a relational database indexed by router identifiers.

For instance, in some examples, synchronization status collector 206 is configured to communicate with or otherwise has access to the synchronization status information associated with the router. For example, synchronization status collector 206 may use simple network management protocol (SNMP) or another communication protocol to query the router and obtain its synchronization status information including, but not limited to, its NTP stratum.

In some other examples, synchronization status collector 206 may be manually provisioned with synchronization status information associated with the router. In some other examples, the router may broadcast its synchronization status information to synchronization status collector 206.

Alternatively, a monitoring system may monitor NTP-related messaging within the network and determine the router's synchronization status (e.g., to which NTP time server the router is connected and the associated stratum of that time server). The monitoring system is then adapted to communicate or share this synchronization status information with synchronization status collector 206.

The availability of router synchronization status information across the range of routers associated with potential label switched paths representing ERO hops enables PCE 102 to apply more restrictive and, in many cases, considerably more useful constraints (e.g., avoiding routers with NTP status stratum 16, where stratum 16 indicates that the router is disconnected from the NTP synchronization network). Synchronization-aware path determiner 210 can effectively avoid constructing a path which includes routers that are furthest away from an authoritative time source, since being furthest away from the authoritative time source generally indicates a larger synchronization error.

As such, PCE 102 is configured for computing a label switched path based not only on conventional TE parameters (e.g., bandwidth, etc.), but also on the degree or precision of synchronization between routers comprising a given path. PCE 102 can therefor preferentially select a high synchronization quality path, in situations where it is requested (e.g., for environments employing hitless rollover using key chain, or other authorization techniques.)

In some examples, PCE 102 uses both path determiner 208 and synchronization-aware path determiner 210 to compute an LSP for a given source and destination. Path determiner 208 computes a initial path between the source and the destination without considering the synchronization status information. Then, synchronization-aware path determiner 210 prunes the initial LSP based on the synchronization status information to remove from the initial LSP one or more routing nodes, e.g., routing nodes each having a degree of synchronization falling below a threshold degree of synchronization. For example, pruning the initial LSP can include pruning ERO nodes with NTP status<stratumx(e.g., <stratum 16). PCE 102 can determine back-up paths in the same manner.

Figure 3:
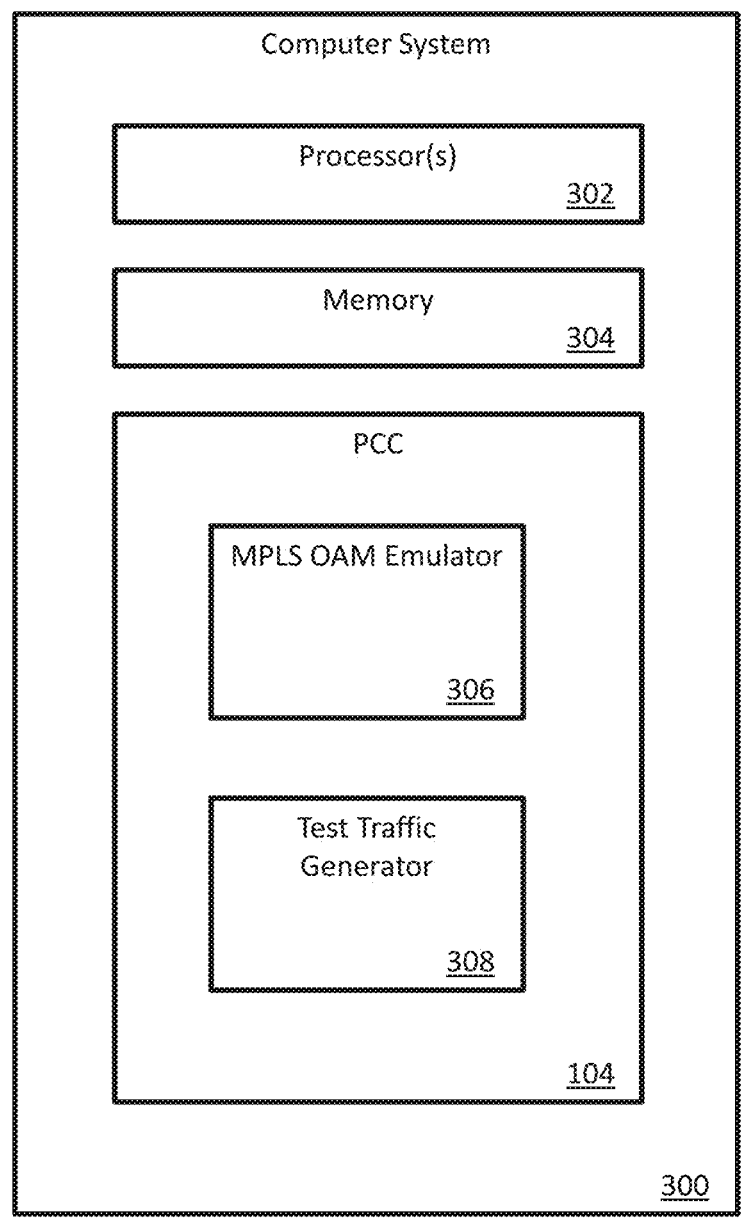
FIG. 3 illustrates an example computer system implementing the PCC of FIG. 1.

FIG. 3 illustrates an example computer system 300 implementing the PCC 104 of FIG. 1. Computer system 300 includes at least one processor 302 and memory 304 (e.g., random access memory) storing executable instructions for the processor. Computer system 300 includes the PCC 104 which is implemented using processors 302 and memory 304.

PCC 104 includes a multiprotocol label switching (MPLS) operations, administration, and maintenance (OAM) emulator 306. MPLS OAM emulator 306 is implemented on processors 302 and memory 304. MPLS OAM emulator 306 is configured for emulating an MPLS element in a label-switched network. PCC 104 also includes a test traffic generator 308 configured for generating test packets for testing LSPs. PCC 104, while requesting an LSP between source and destination nodes, may implement a METRIC type "SYNC" (along with existing metric types such as TE, IGP, Hop Count) to inform a synchronization-aware PCE that PCC 104 is requesting a synchronization-aware path computation (e.g. exclude NTP stratum 16 nodes).

In operation, MPLS OAM emulator 306 receives, from a path computation element (PCE) for the label-switching network, a segment routing (SR) explicit route object (ERO) for a label-switched path (LSP) determined by the PCE using synchronization status information for a plurality of routing nodes in the label-switched network. MPLS OAM emulator 306 sends an MPLS echo request to downstream routing nodes specified by the SR ERO. MPLS OAM emulator 306 receives a respective MPLS echo reply from each of the downstream routing nodes. MPLS OAM emulator 306 validates the LSP using the MPLS echo replies and, in response to validating the LSP, transitioning the LSP state from down to up.

Figure 4:
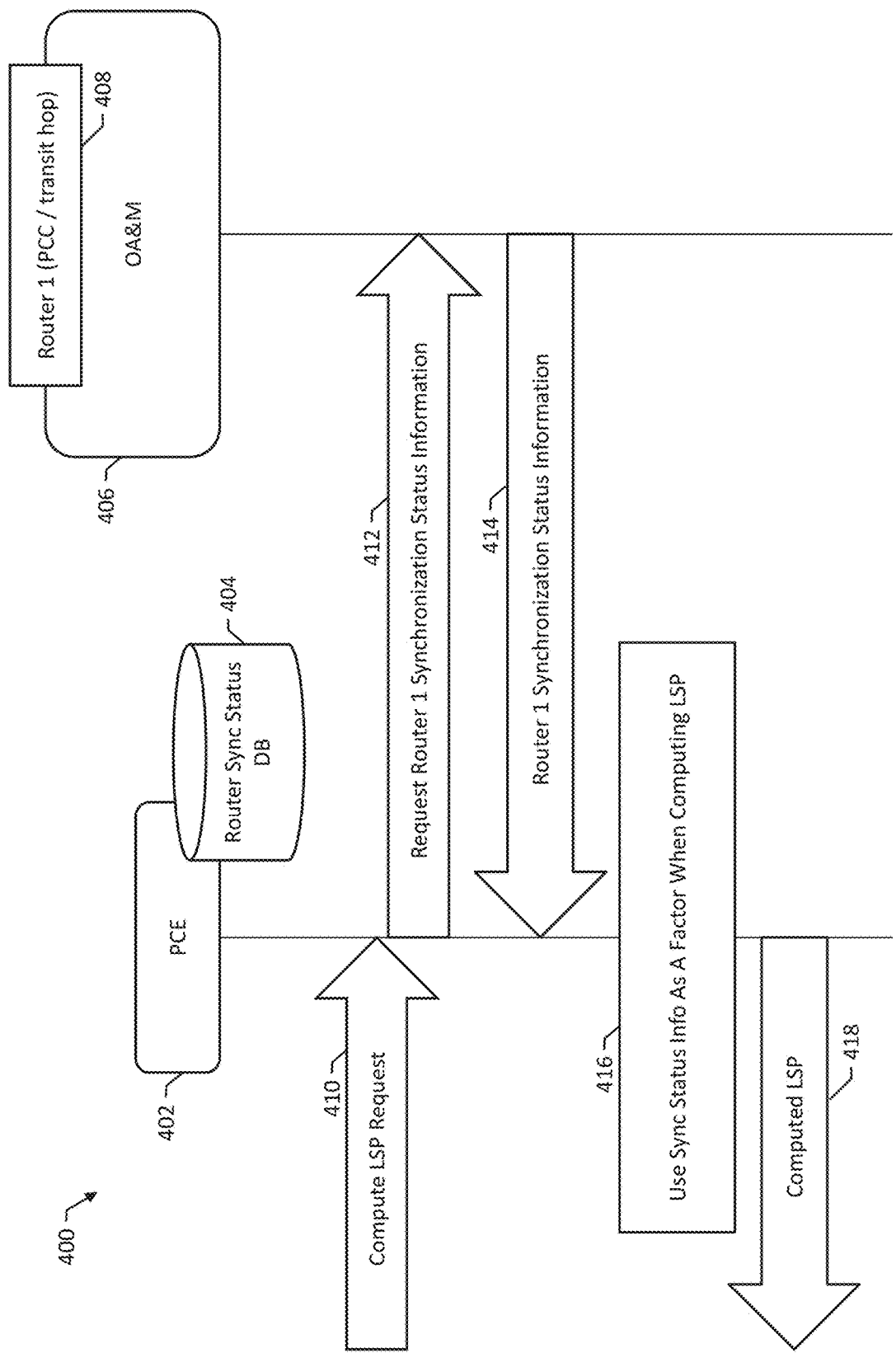
FIG. 4 is a message diagram illustrating an example message exchange for computing label-switched data communication paths.

FIG. 4 is a message diagram illustrating an example message exchange 400 for computing label-switched data communication paths. During message exchange 400, a PCE 402 having a router synchronization status information database 404 exchanges messages with an OAM node 406 that is in communication with at least one router 408 (e.g., a PCC or a transit hop node).

PCE 402 receives a message 410 from a PCC with a request to compute a LSP for a given source and destination. PCE 402 sends a message 412 to OAM sub-system 406 of transit router 408 with a request for synchronization status information for the router 408. OAM node 406 sends a message 414 with the synchronization status information, and PCE 402 stores the synchronization status information in database 404. PCE 402 then uses 416 the synchronization status information, and synchronization status information for other routers collected in a similar manner being considered for the LSP which is stored in database 404, as a factor when computing the LSP responsive to message 410. PCE 402 sends a message 418 with an ERO for the responsive LSP to the client.

Figure 5:
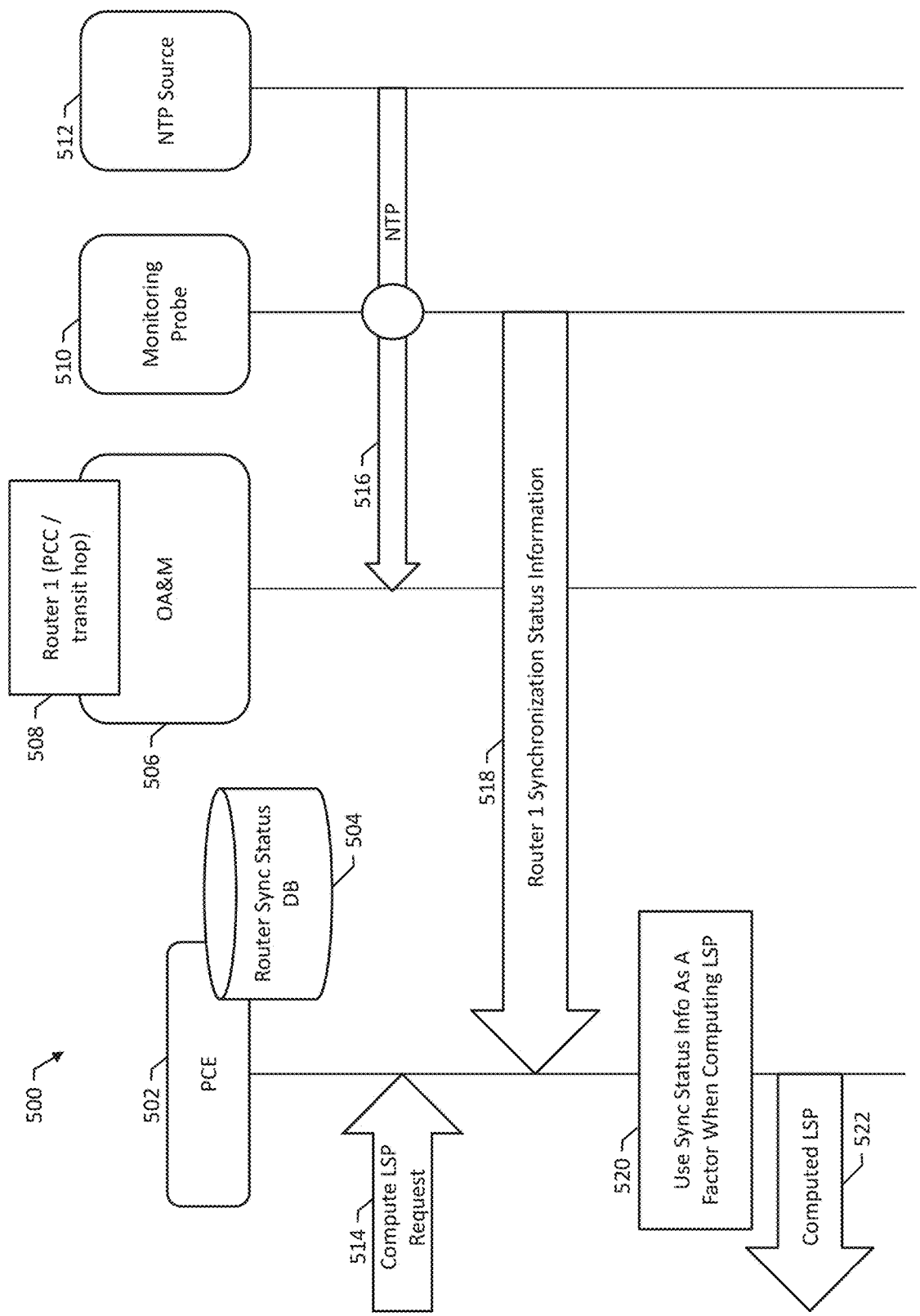
FIG. 5 is a message diagram illustrating an example message exchange for computing label-switched data communication paths.

FIG. 5 is a message diagram illustrating an example message exchange 500 for computing label-switched data communication paths. During message exchange 500, a PCE 502 having a router synchronization status information database 504 exchanges messages with a monitoring probe 510 that is monitoring messages between an OAM sub-system 506 of transit router 508 (representing the part of ERO determined by path determiner with considering synchronization information) and an NTP source 512.

PCE 502 receives a message 514 from a PCC with a request to compute a LSP for a given source and destination. Monitoring probe 510 monitors a message 516 from NTP source 512 to OAM sub-system 506 and determines synchronization status information for router 508 based on message 516. Monitoring probe 510 sends a message 518 to PCE 502 with the synchronization status information, and PCE 502 stores the synchronization status information in database 504. PCE 502 then uses 520 the synchronization status information, and synchronization status information for other routers collected in a similar manner being considered for the LSP which is stored in database 504, as a factor when computing the LSP response to message 514. PCE 502 sends a message 522 with an ERO for the responsive LSP to the client.

Figure 6:
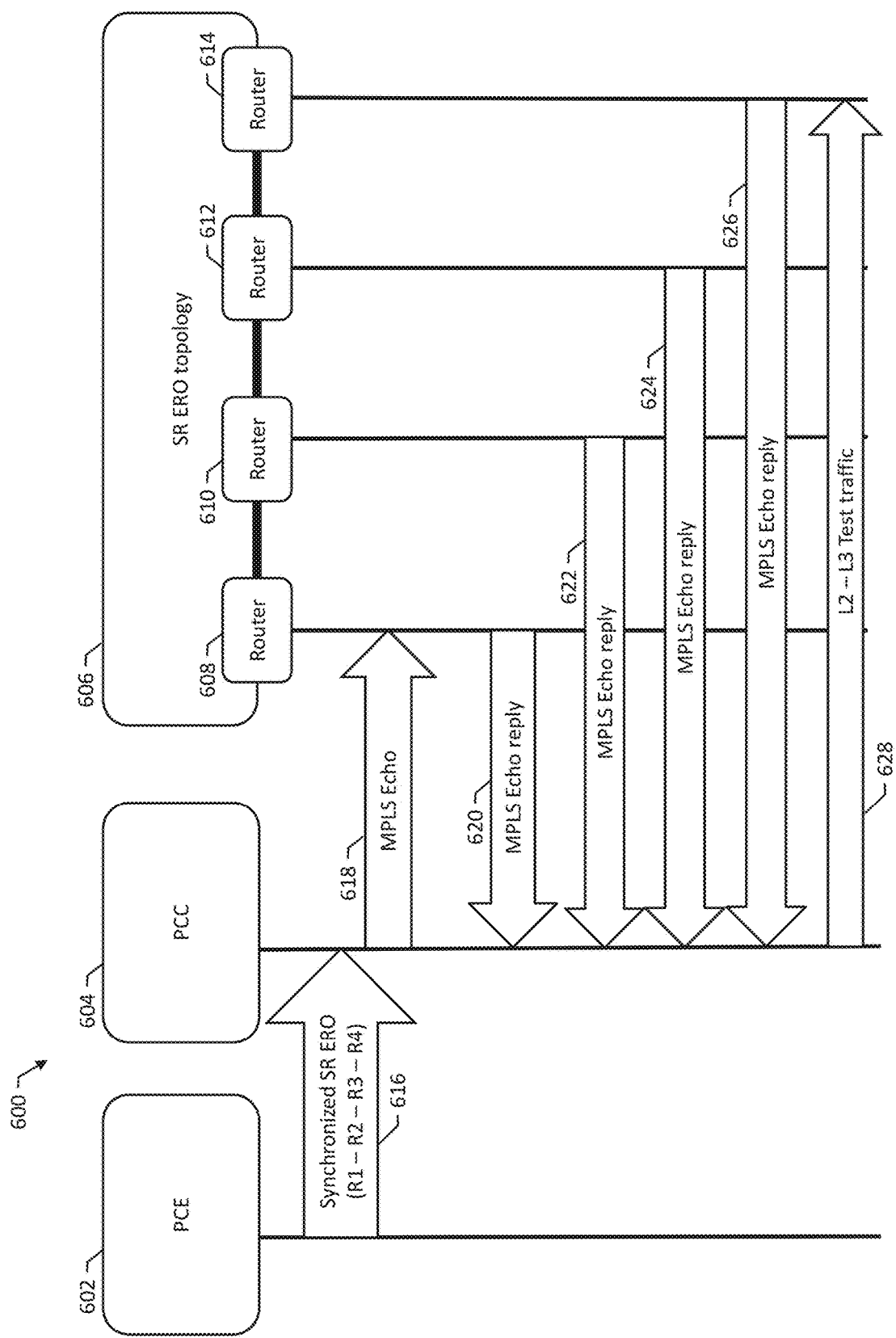
FIG. 6 is a message diagram illustrating an example message exchange for validating label-switched data communication paths.

FIG. 6 is a message diagram illustrating an example message exchange 600 for validating label-switched data communication paths. During message exchange 600, messages are exchanged between a PCE 602, a PCC 604, and a segment routed (SR) ERO topology 606 including at least routing nodes 608, 610, 612, and 614.

PCE 602 sends a message 616 to PCC 604 with an SR ERO specifying routing nodes 608, 610, 612, and 614. PCE 602 determined the SR ERO using synchronization status information for routing nodes 608, 610, 612, and 614, so that sender and receiver timestamps in an MPLS echo request and reply are guaranteed to be correct or accurate to at least a threshold level of accuracy.

PCC 604 sends an MPLS echo request 618 to routing nodes 608, 610, 612, and 614. PCC 604 receives MPLS echo replies 620, 622, 624, and 626 from each of routing nodes 608, 610, 612, and 614. PCC 604 interprets MPLS echo replies 620, 622, 624, and 626 to validate the LSP specified by the SR ERO from PCE 602. In response to validating the LSP, PCC 604 transitions the LSP state from down to up and begins transmitting messages 628 with test traffic, e.g., layer 2-layer 3 (L2-L3) test traffic.

Figure 7:
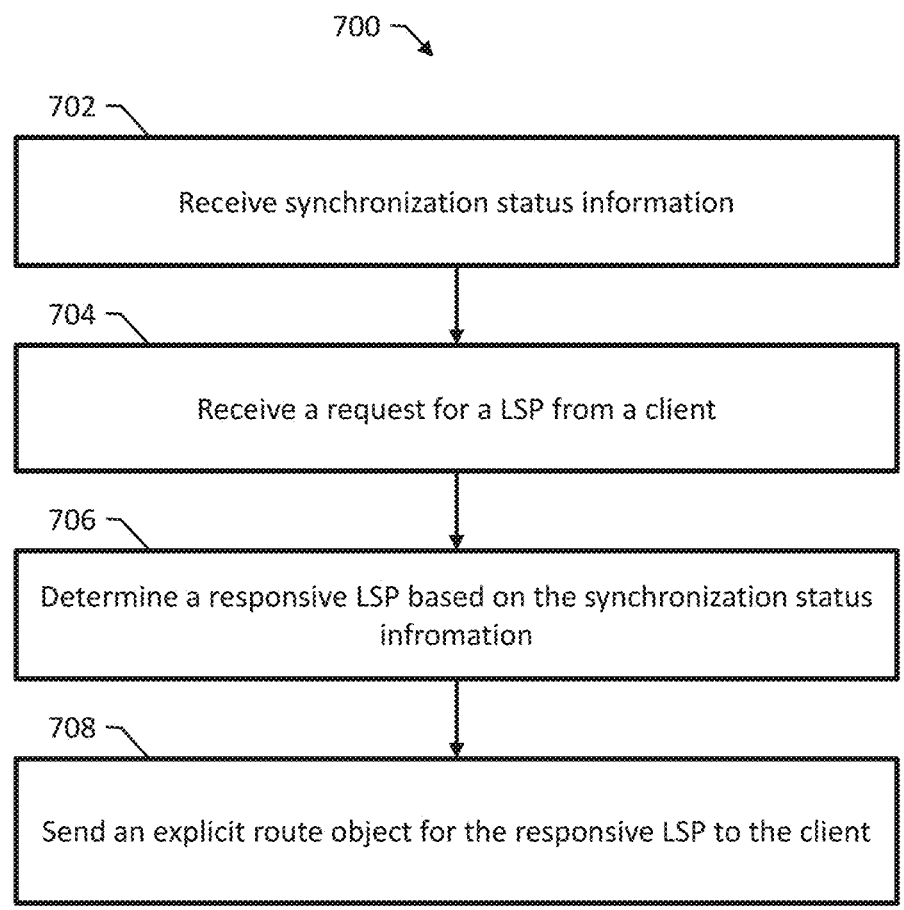
FIG. 7 is a flow diagram of an example method for computing label-switched data communication paths.

FIG. 7 is a flow diagram of an example method 700 for computing label-switched data communication paths. Method 700 may be performed by the PCE 102 of FIGS. 1 and 2.

Method 700 includes receiving 702 synchronization status information for routing nodes in a label-switched network. Receiving synchronization status information can include receiving network time protocol (NTP) stratum information for each routing node. Receiving synchronization status information can include requesting the synchronization status information from an operations, administration, and maintenance (OAM) subsystem of the label-switched network.

In some examples, receiving synchronization status information includes receiving the synchronization status information from a monitoring system monitoring synchronization messaging by the routing nodes in the label-switched network. In some other examples, receiving synchronization status information includes querying each of the routing nodes or receiving broadcast messages from each of the routing nodes.

Method 700 includes receiving 704 a request for a label-switched path (LSP) from a client. Method 700 includes determining 706 a responsive LSP based at least in part on the synchronization status information. Method 700 includes sending 708 an explicit route object (ERO) for the responsive LSP to the client.

Determining 706 the responsive LSP can include determining an initial LSP based on one or more traffic engineering parameters. Method 700 can then include pruning the initial LSP based on the synchronization status information to remove from the initial LSP one or more routing nodes each having a respective degree of synchronization below a threshold degree of synchronization.

In some examples, the routing nodes in the label-switched network are configured to communicate using a routing protocol specifying a synchronization-sensitive authentication. For instance, in some examples, the routing nodes in the label-switched network are configured to communicate using an intermediate system to intermediate system (IS-IS) protocol and to authenticate using hitless authentication key rollover.

IS-IS allows for the configuration of a password for a specified link, an area, or a domain. Routers that want to become neighbors exchange the same password for their configured level of authentication. A router not in possession of the appropriate password is prohibited from participating in the corresponding function (that is, it may not initialize a link, be a member of an area, or be a member of a Level 2 domain, respectively.)

IS-IS protocol exchanges can be authenticated to guarantee that only trusted routing devices participate in routing. By default, authentication is disabled. The authentication algorithm creates an encoded checksum that is included in the transmitted packet. The receiving routing device uses an authentication key (password) to verify the packet's checksum.

If authentication is configured for all peers, each peer in that group inherits the group's authentication. Authentication keys can be updated without resetting any IS-IS neighbor sessions. This is referred to as hitless authentication key rollover. Hitless authentication key rollover uses authentication keychains, which include authentication keys that are being updated. The keychain includes multiple keys. Each key in the keychain has a unique start time. At the next key's start time, a rollover occurs from the current key to the next key, and the next key becomes the current key.

The algorithm through which authentication is established can be configured, e.g., to use MD5 or secure hash algorithm (SHA) authentication. A keychain is associated with the authentication algorithm and an IS-IS neighboring session. Each key contains an identifier and a secret password.

The sending peer chooses the active key based on the system time and the start times of the keys in the keychain. The receiving peer determines the key with which it authenticates based on the incoming key identifier. Due to the use of timing information, hitless authentication key rollover is synchronization-sensitive.

Figure 8:
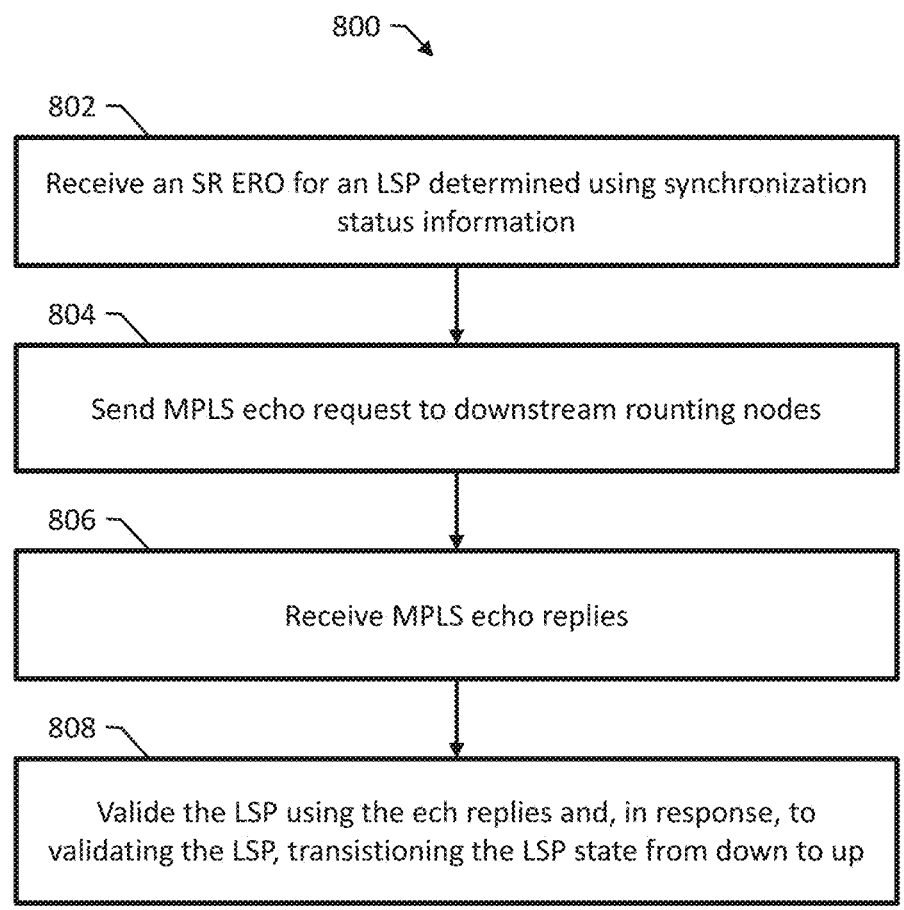
FIG. 8 is a flow diagram of an example method for computing label-switched data communication paths.

FIG. 8 is a flow diagram of an example method 800 for using computed label-switched data communication paths at PCC. Method 800 may be performed by the PCC 104 of FIGS. 1 and 3.

Method 800 includes receiving 802, from a path computation element (PCE) for the label-switching network, a segment routing (SR) explicit route object (ERO) for a label-switched path (LSP) determined by the PCE using synchronization status information for a plurality of routing nodes in the label-switched network.

Method 800 includes sending 804 an MPLS echo request to downstream routing nodes specified by the SR ERO. Sending 804 the MPLS echo request to the downstream routing nodes can include sending the MPLS echo request with a target forwarding equivalence class (FEC) stack type-length-value (TLV) for validating the LSP.

Method 800 includes receiving 806 a respective MPLS echo reply from each of the downstream routing nodes. Method 800 includes validating 808 the LSP using the MPLS echo replies and, in response to validating the LSP, transitioning the LSP state from down to up. In some examples, method 800 includes informing a test traffic generator to inject test packets into the LSP in response to validating the LSP.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system for validating label-switched data communication paths, the system comprising:
   at least one processor; and
   a multiprotocol label switching (MPLS) operations, administration, and maintenance (OAM) emulator, implemented on the at least one processor, and configured for emulating an MPLS element in a label-switched network and for:
   receiving, from a path computation element (PCE) for the label-switching network, a segment routing (SR) explicit route object (ERG) for a label-switched path (LSP) determined by the PCE using synchronization status information for a plurality of routing nodes in the label-switched network;
   sending an MPLS echo request to a plurality of downstream routing nodes specified by the SR ERG;
   receiving a respective MPLS echo reply from each of the downstream routing nodes; and
   validating the LSP using the MPLS echo replies using sent and
   received timestamps and, in response to validating the LSP, transitioning the LSP state from down to up;
   wherein sending an MPLS echo request to the downstream routing nodes comprises sending the MPLS echo request with a target forwarding equivalence class (FEC) stack type-length-value (TLV) for validating the LSP.

2. The system of claim 1 comprising a test traffic generator configured for generating test packets for testing the LSP, wherein the MPLS OAM emulator is configured for informing the test traffic generator to inject the test packets into the LSP in response to validating the LSP.

3. A method for validating label-switched data communication paths, the method comprising:
   at a multiprotocol label switching (MPLS) operations, administration, and maintenance (GAM) emulator, implemented on the at least one processor, and configured for emulating an MPLS element in a label-switched network:
   receiving, from a path computation element (PCE) for the label-switching network, a segment routing (SR) explicit route object (ERG) for a label-switched path (LSP) determined by the PCE using synchronization status information for a plurality of routing nodes in the label-switched network;
   sending an MPLS echo request to a plurality of downstream routing nodes specified by the SR ERG;
   receiving a respective MPLS echo reply from each of the downstream routing nodes; and
   validating the LSP using the MPLS echo replies using sent and received timestamps and, in response to validating the LSP, transitioning the LSP state from down to up;
   wherein sending an MPLS echo request to the downstream routing nodes comprises sending the MPLS echo request with a target forwarding equivalence class (FEC) stack type-length-value (TLV) for validating the LSP.

4. The method of claim 3, comprising informing a test traffic generator to inject test packets into the LSP in response to validating the LSP.

5. A non-transitory computer readable medium storing executable instructions that when executed by at least one processor of a computer control the computer to perform operations comprising:
   at a multiprotocol label switching (MPLS) operations, administration, and maintenance (GAM) emulator, implemented on the at least one processor, and configured for emulating an MPLS element in a label-switched network:
   receiving, from a path computation element (PCE) for the label-switching network, a segment routing (SR) explicit route object (ERG) for a label-switched path (LSP) determined by the PCE using synchronization status information for a plurality of routing nodes in the label-switched network;
   sending an MPLS echo request to a plurality of downstream routing nodes specified by the SR ERG; receiving a respective MPLS echo reply from each of the downstream routing nodes; and
   validating the LSP using the MPLS echo replies using sent and received timestamps and, in response to validating the LSP, transitioning the LSP state from down to up;
   wherein sending an MPLS echo request to the downstream routing nodes comprises sending the MPLS echo request with a target forwarding equivalence class (FEC) stack type-length-value (TLV) for validating the LSP.

6. The non-transitory computer readable medium of claim 5, comprising informing a test traffic generator to inject test packets into the LSP in response to validating the LSP.

* * * * *

UNITED STATES PATENT AND TRADEMARK OFFICE
CERTIFICATE OF CORRECTION

PATENT NO. : 10,924,394 B2
APPLICATION NO. : 16/557405
DATED : February 16, 2021
INVENTOR(S) : Joy Chakraborty et al.

Page 1 of 1

It is certified that error appears in the above-identified patent and that said Letters Patent is hereby corrected as shown below:

In the Claims

In Column 9, Line 29, in Claim 1, delete "(ERG)" and insert -- (ERO) --, therefor.

In Column 9, Line 34, in Claim 1, delete "ERG;" and insert -- ERO; --, therefor.

In Column 9, Line 54, in Claim 3, delete "(GAM)" and insert -- (OAM) --, therefor.

In Column 10, Line 3, in Claim 3, delete "(ERG)" and insert -- (ERO) --, therefor.

In Column 10, Line 8, in Claim 3, delete "ERG;" and insert -- ERO; --, therefor.

In Column 10, Line 29, in Claim 5, delete "(GAM)" and insert -- (OAM) --, therefor.

In Column 10, Line 36, in Claim 5, delete "(ERG)" and insert -- (ERO) --, therefor.

In Column 10, Line 41, in Claim 5, delete "ERG;" and insert -- ERO; --, therefor.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*